US012631907B2

(12) United States Patent
Li et al.

(10) Patent No.: US 12,631,907 B2
(45) Date of Patent: May 19, 2026

(54) GLASSES AND WEARABLE SYSTEM

(71) Applicant: Huawei Technologies Co., Ltd.,
Shenzhen (CN)

(72) Inventors: Kuokuo Li, Dongguan (CN); Yipang Lin, Dongguan (CN); Qingchun Lu, Dongguan (CN); Xiuqing Guo, Dongguan (CN)

(73) Assignee: Huawei Technologies Co., Ltd.,
Shenzhen (CN)

( * ) Notice: Subject to any disclaimer, the term of this patent is extended or adjusted under 35 U.S.C. 154(b) by 332 days.

(21) Appl. No.: 18/278,860

(22) PCT Filed: Jan. 24, 2022

(86) PCT No.: PCT/CN2022/073393

§ 371 (c)(1),
(2) Date: Aug. 25, 2023

(87) PCT Pub. No.: WO2022/179369

PCT Pub. Date: Sep. 1, 2022

(65) Prior Publication Data

US 2024/0134213 A1     Apr. 25, 2024
US 2024/0231130 A9     Jul. 11, 2024

(30) Foreign Application Priority Data

Feb. 26, 2021     (CN) .......................... 202110217515.7

(51) Int. Cl.
*G02C 11/00*          (2006.01)
*G01L 5/165*          (2020.01)
(Continued)

(52) U.S. Cl.
CPC .............. *G02C 11/10* (2013.01); *G01L 5/165* (2013.01); *G02C 5/143* (2013.01); *G02C 13/001* (2013.01)

(58) Field of Classification Search
CPC ...... G02C 11/10; G02C 5/143; G02C 13/001; G01L 5/165; G01D 5/24; H03K 17/955
(Continued)

(56) References Cited

U.S. PATENT DOCUMENTS 8,801,174 B2 *   8/2014   Willey ................... G02C 5/146
                                                                 351/158
11,163,155 B1 *  11/2021  Castañeda ............. G06F 1/3231
(Continued)

FOREIGN PATENT DOCUMENTS

CN        202033539 U      11/2011
CN        204832705 U      12/2015
(Continued)

*Primary Examiner* — William R Alexander
(74) *Attorney, Agent, or Firm* — Slater Matsil, LLP

(57) ABSTRACT

Embodiments of this application provide glasses and a wearable system. The glasses include a glasses frame and two temples connected to two sides of the glasses frame. The temple includes a shell and an inner cover. The inner cover is disposed on the shell to form an accommodation space, a main board is disposed in the accommodation space, and a wearing detection device is disposed on the main board. A detection electrode is disposed on an outer wall surface of the inner cover, and the detection electrode is connected to the main board. The detection electrode is configured to generate capacitive sensing between the detection electrode and a human body.

16 Claims, 6 Drawing Sheets

(51) Int. Cl.
    *G02C 5/14*          (2006.01)
    *G02C 13/00*       (2006.01)

(58) Field of Classification Search
    USPC ............................................. 351/41
    See application file for complete search history.

(56)                References Cited

U.S. PATENT DOCUMENTS

| | | | | |
|---|---|---|---|---|
| 2013/0154906 | A1* | 6/2013 | Braun ..................... | G06F 1/325 |
| | | | | 345/8 |
| 2015/0156196 | A1* | 6/2015 | Kim ........................ | G02C 11/10 |
| | | | | 726/5 |
| 2020/0004334 | A1* | 1/2020 | Komaki .................. | G06F 1/163 |
| 2020/0041822 | A1* | 2/2020 | Blum ....................... | G02C 5/22 |
| 2020/0133025 | A1* | 4/2020 | Muramatsu ............ | G02C 7/101 |
| 2020/0174558 | A1 | 6/2020 | Gui et al. | |
| 2020/0363652 | A1* | 11/2020 | Hino ......................... | G02C 7/06 |
| 2021/0405361 | A1* | 12/2021 | Castañeda ................ | G02C 5/12 |

FOREIGN PATENT DOCUMENTS

| | | |
|---|---|---|
| CN | 206057715 U | 3/2017 |
| CN | 110784793 A | 2/2020 |
| CN | 212410976 U | 1/2021 |
| JP | 2021009719 A | 1/2021 |

\* cited by examiner

GLASSES AND WEARABLE SYSTEM

CROSS REFERENCE TO RELATED APPLICATIONS

This application is a national stage of International Application No. PCT/CN2022/073393, filed on Jan. 24, 2022, which claims priority to Chinese Patent Application No. 202110217515.7, filed on Feb. 26, 2021. Both of the aforementioned applications are hereby incorporated by reference in their entireties.

TECHNICAL FIELD

This application relates to the field of wearable device technologies, and in particular, to glasses and a wearable system.

BACKGROUND

As a wearable device, smart glasses combine the latest IT technology with functions of conventional glasses, and can be used for virtual reality, audio playing, and the like. The smart glasses have become increasingly popular because of advantages such as easy portability, easy use, rich functions, and the like. The smart glasses have an independent operating system and can implement various functions through software installation.

In a related technology, a sensor flexible circuit board is used to implement a wearing detection function, a detection electrode is disposed on the flexible circuit board to form capacitance with a human body to generate sensing, and the sensor flexible circuit board is fastened on an inner wall of a temple by using adhesive.

The sensor flexible circuit board and the human body are separated by a thickness of the adhesive and a wall thickness of the temple. Therefore, the detection electrode on the sensor flexible circuit board is far away from the human body, resulting in poor detection effect.

SUMMARY

Embodiments of this application provide glasses and a wearable system, to improve detection effect of a wearing detection function of the glasses.

In one aspect, an embodiment of this application provides glasses, including a glasses frame and two temples connected to two sides of the glasses frame. The temple includes a shell and an inner cover. The inner cover covers the shell to form an accommodation space, a main board is disposed in the accommodation space, and a wearing detection device is disposed on the main board. A detection electrode is disposed on an outer wall surface of the inner cover, and the detection electrode is connected to the main board. The detection electrode is configured to generate capacitive sensing between the detection electrode and a human body.

This embodiment of this application provides the glasses. The detection electrode is disposed on the outer wall surface of the inner cover, so that a detection area can be increased, a distance between the detection electrode and the human body can be reduced, and a problem of unreliable fastening of a flexible circuit board can be avoided, thereby greatly optimizing detection effect of a wearing detection function.

In a possible implementation, the inner cover is formed through laser direct structuring LDS, and laser activation is performed on a partial area on the outer wall surface of the inner cover to form the detection electrode.

The detection electrode is formed by laser activation on the outer wall surface of the inner cover of the temple by using the laser direct structuring process, so that the detection area can be increased, the distance between the detection electrode and the human body can be reduced, and the problem of unreliable fastening of the flexible circuit board can be avoided, thereby greatly optimizing the detection effect of the wearing detection function.

In a possible implementation, an accommodation groove is disposed on the outer wall surface of the inner cover, and the accommodation groove is filled with metal silver paste to form the detection electrode.

The groove is disposed on the outer wall surface of the inner cover of the temple, and the accommodation groove is coated with the metal silver paste to form the detection electrode, so that the detection area can be increased, the distance between the detection electrode and the human body can be reduced, and the problem of unreliable fastening of the flexible circuit board can be avoided, thereby greatly optimizing the detection effect of the wearing detection function.

In a possible implementation, a conductive via is disposed on the inner cover, and the detection electrode is connected to the main board through the conductive via.

The conductive via is a via that is disposed on the inner cover and penetrates inner and outer wall surfaces of the inner cover, and the conductive via has electrical connection performance, so as to connect to the main board and the detection electrode that are respectively located on inner and outer sides of the inner cover.

In a possible implementation, a conductive rib protrudes on the inner wall surface of the inner cover, the conductive rib is connected to the conductive via, and the main board abuts against and is connected to the conductive rib by using a spring plate.

The conductive rib protruding on the inner wall surface of the inner cover facilitates a connection between the main board and the conductive via. In addition, the spring plate contacts the conductive rib to implement an electrical connection, so that reliability of a connection between the main board and the conductive rib can be ensured.

In a possible implementation, a connection electrode is further disposed on the outer wall surface of the inner cover, and the connection electrode is connected between the detection electrode and the conductive via.

The detection electrode disposed in an arc area can implement a reliable electrical connection with the conductive via that is on a main body area and that faces the main board by using the connection electrode extending to the main body area.

In a possible implementation, the temple includes the main body area, the are area, and a temple tip that are sequentially connected. The main body area is connected to the glasses frame, the main board is disposed in the main body area, and a battery is disposed in the temple tip. The are area is configured to be hung on an ear of a user, and the detection electrode is disposed on the outer wall surface of the inner cover in the are area.

The are area is hung on the ear and fits the head of the user, and the detection electrode is disposed on the outer wall surface of the inner cover in the are area, so that the distance between the detection electrode and the human body is minimized, and this helps to improve the detection effect.

In a possible implementation, an outer surface of the detection electrode is coated with an appearance paint layer.

The outer surface of the detection electrode may be coated with the appearance paint layer, so that a color of the detection electrode is consistent with a color of another position of the inner cover, to ensure exquisite effect of an appearance of the temple.

In a possible implementation, a thickness of the appearance paint layer is less than 0.1 mm.

The distance between the detection electrode provided in this embodiment of this application and the human body is the thickness of the appearance paint layer, and the thickness of the appearance paint layer is less than 0.1 mm, which is far less than a distance between a detection electrode and a human body in a related technology. Therefore, the detection effect of wearing detection can be greatly improved.

In a possible implementation, detection electrodes are respectively disposed on inner covers of the two temples, wearing detection devices are respectively disposed inside the two temples, and the two wearing detection devices are communicatively connected.

When the two detection electrodes are disposed, accuracy of wearing detection can be effectively improved. For example, wearing misjudgment caused by the user grasping the temple and touching the detection electrode can be eliminated.

In another aspect, an embodiment of this application further provides a wearable system, including a terminal device and the foregoing glasses. The terminal device and the glasses are communicatively connected.

According to the wearable system provided in this embodiment of this application, the glasses having a wearing detection function is connected to the terminal device. For the glasses, a detection electrode is disposed on an outer wall surface of an inner cover, so that a detection area can be increased and a distance between the detection electrode and a human body can be reduced, thereby greatly optimizing detection effect of the wearing detection function, and improving an overall user experience of the wearable system.

DESCRIPTIONS OF REFERENCE NUMERALS

100—temple; 10—flexible circuit board; 101—main body area; 102—arc area;

103—temple tip; 11—shell; 12—inner cover; 12a—outer wall surface;

12b—inner wall surface; 121—detection electrode; 122—connection electrode; 123—conductive via;

124—conductive rib; 125—accommodation groove; 126—connection groove; 200—glasses frame;

300—main board; 31—wearing detection device; and 32—spring plate

DETAILED DESCRIPTION OF ILLUSTRATIVE EMBODIMENTS

Smart glasses can be folded and stored like ordinary glasses, and can further be used in different human-machine interaction scenarios. When wearing the smart glasses, a user can complete functions such as adding a schedule, navigation on a map, interacting with friends, taking photos and videos, making video calls with friends, and listening to music through voice or action control, and may implement wireless network access through a mobile communication network.

Figure 1:
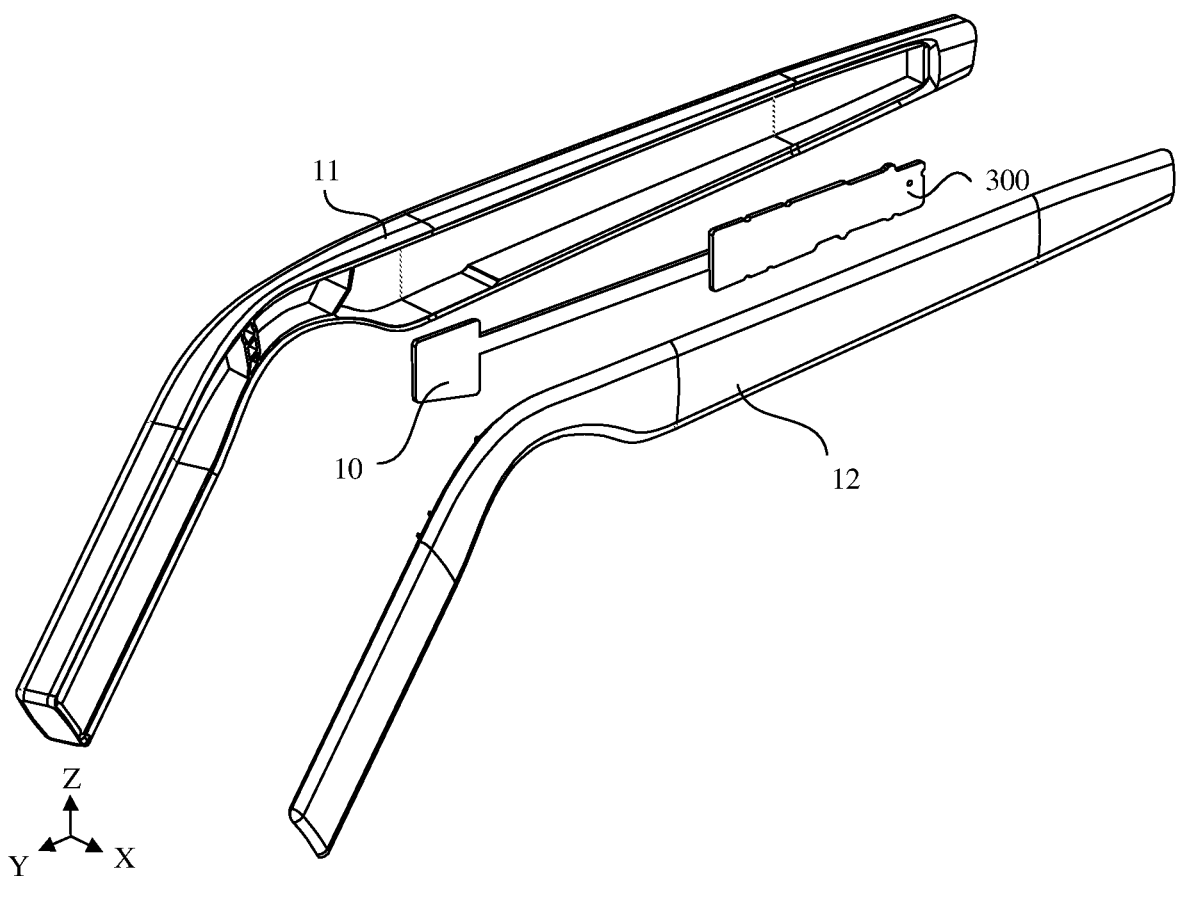
FIG. 1 is a schematic exploded diagram of a temple according to a related technology.
Figure 2:
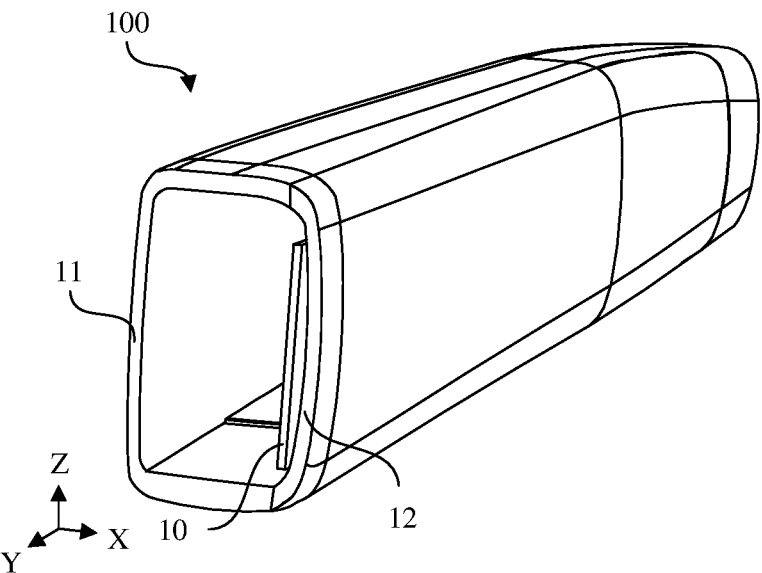
FIG. 2 is a schematic sectional diagram of a temple according to a related technology.

FIG. 1 is a schematic exploded diagram of a temple according to a related technology. FIG. 2 is a schematic sectional diagram of a temple according to a related technology. As shown in FIG. 1 and FIG. 2, in the related technology, a temple 100 includes a shell 11 and an inner cover 12. The inner cover 12 covers the shell 11, and the shell 11 and the inner cover 12 are enclosed to form an accommodation space. A main board 300 and a flexible circuit board 10 connected to the main board 300 are disposed in the accommodation space. A partial area on the flexible circuit board 10 may be used as a detection electrode of a sensor, and the detection electrode is disposed facing an inner wall of the inner cover 12.

After a user wears glasses, the inner cover 12 of the temple 100 is close to the head of a human body. Capacitance is formed between the detection electrode of the sensor and the human body for sensing. The sensor may identify, based on a capacitance change, that the glasses are worn, so as to implement a wearing detection function of the glasses. Detection effect of the sensor is affected by an area of the detection electrode and a distance between the detection electrode and the human body. A larger area of the detection electrode indicates higher detection accuracy of the sensor, and a closer distance between the detection electrode and the human body indicates higher detection accuracy of the sensor.

In the related technology, the flexible circuit board 10 is fastened on an inner wall surface of the inner cover 12 by using adhesive. In one aspect, fastening of the flexible circuit board 10 fastened by using the adhesive is unstable, and problems such as tilting are prone to occur, resulting in an unstable distance between the detection electrode on the flexible circuit board 10 and the inner wall surface of the inner cover 12. In another aspect, a thickness of the adhesive and a wall thickness of the inner cover 12 are separated between the flexible circuit board 10 and the human body. Therefore, the detection electrode on the flexible circuit board 10 is far away from the human body, resulting in poor detection effect. In still another aspect, an area of the flexible circuit board 10 is limited by an area of the accommodation space in the temple 100, and wires need to be arranged on a surface of the flexible circuit board 10 and occupy a partial area of the detection electrode. Therefore, the area of the detection electrode is small.

In conclusion, a solution of disposing the detection electrode of the sensor on the flexible circuit board 10 inside the temple 100 provided in the related technology has disadvantages of a small detection area, a long distance between the detection electrode and the human body, and unstable detection, and these greatly affect detection effect of the wearing detection function of the glasses.

Based on this, an embodiment of this application provides glasses. A detection electrode is disposed on an outer wall surface of an inner cover, so that a detection area can be increased, a distance between the detection electrode and a human body can be reduced, and a problem of unreliable fastening of a flexible circuit board can be avoided, thereby greatly optimizing detection effect of a wearing detection function.

The following describes in detail the glasses provided in this embodiment of this application with reference to accompanying drawings.

Figure 3:
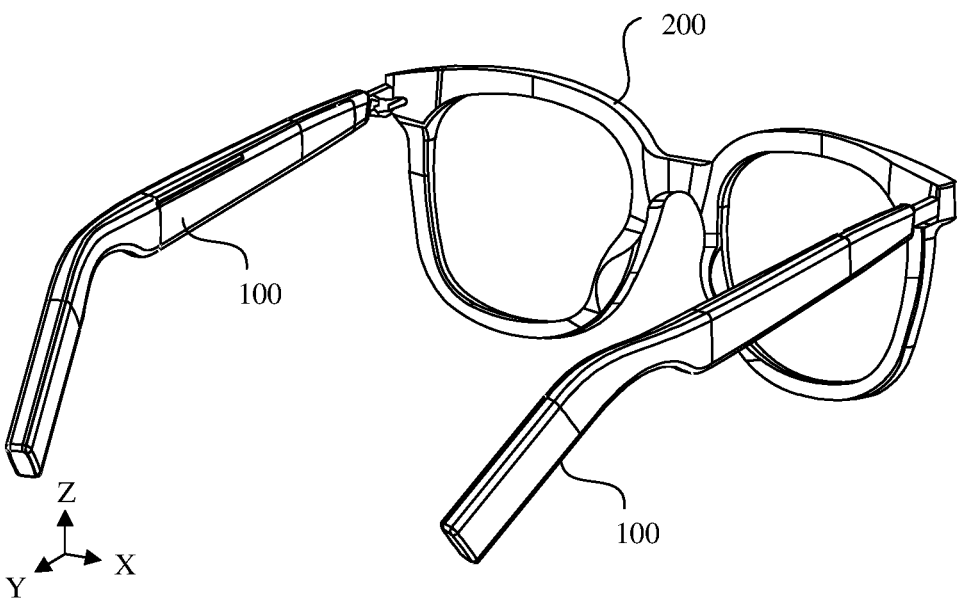
FIG. 3 is a schematic diagram of a structure of glasses according to an embodiment of this application.

FIG. 3 is a schematic diagram of a structure of glasses according to an embodiment of this application. Refer to FIG. 3. The glasses provided in this embodiment of this application may include temples 100 and a glasses frame 200. The two temples 100 are rotatably connected to two sides of the glasses frame 200. The glasses frame 200 is configured to install lenses. A material of the glasses frame 200 may be a material such as metal, plastic, or carbon fiber. The glasses frame 200 further has a structure such as a nose pad. A specific structure of the glasses frame 200 is not further described in this embodiment. The two temples 100 are respectively configured to be hung on a left ear and a right ear of a user. Components such as a speaker, a battery, and a main board may be disposed in the temples 100, so as to implement functions such as playing music and answering a call of the glasses.

It should be noted that, in accompanying drawings of embodiments of this application, a positive direction of an X axis is a direction from the temple 100 hung on the left ear to the temple 100 hung on the right ear. A positive direction of a Y axis is a direction from an end connected to the glasses frame 200 to an end away from the glasses frame 200 in a length direction of the temple 100 when the glasses are in use, in other words, when the temples 100 are unfolded. A positive direction of a Z axis is a direction from a lower part to an upper part of the glasses frame 200 when the user wears the glasses. It may be understood that the left and right temples 100 are disposed in a mirror symmetric structure. In the following embodiments, a specific structure of the temple 100 is described by using the temple 100 hung on the left ear as an example.

Figure 4:
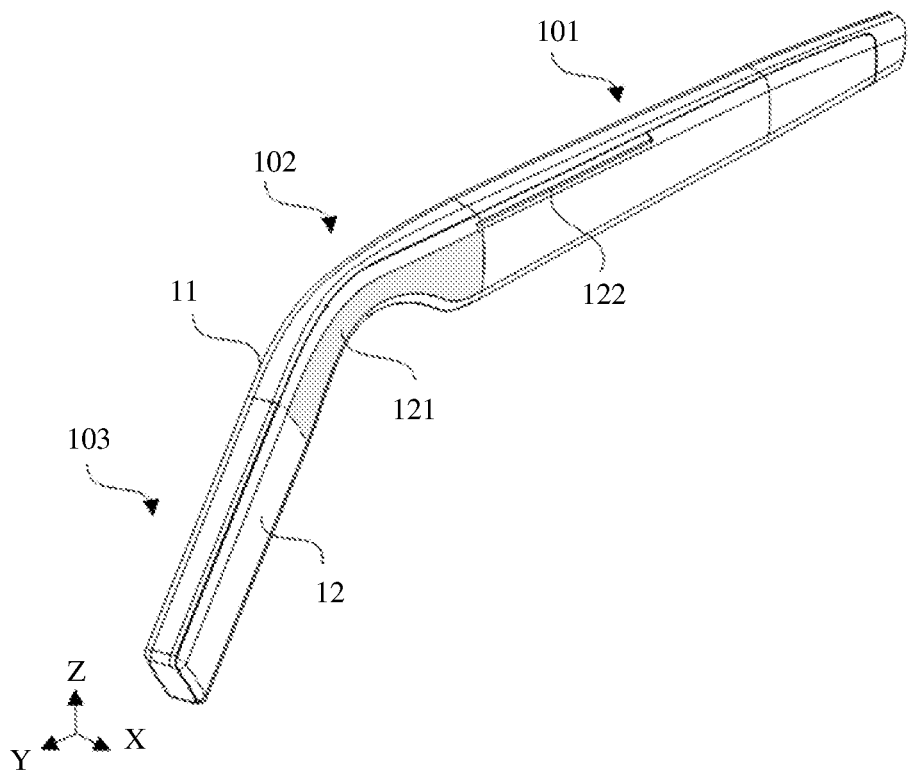
FIG. 4 is a schematic diagram of a structure of a temple according to an embodiment of this application.

FIG. 4 is a schematic diagram of a structure of the temple according to an embodiment of this application. Refer to FIG. 4. The temple 100 may include a main body area 101, an arc area 102, and a temple tip 103 that are sequentially connected. The main body area 101 is connected to the glasses frame 200, and the are area 102 is configured to be hung on the ear of the user. When the user wears the glasses, the are area 102 is hung on the ear and fits the head of the user, and the main body area 101 and the temple tip 103 are respectively located on a front side and a rear side of the ear of the user.

The temple 100 may include a shell 11 and an inner cover 12. The shell 11 is located on a side that is of the temple 100 and that is away from the head of the user, and the inner cover 12 is located on a side that is of the temple 100 and that faces the head of the user. A side that is of the shell 11 and that faces the inner cover 12 is an open side, and the inner cover 12 is disposed on the opening side and is sealedly connected to the shell 11. The shell 11 and the inner cover 12 may be enclosed to form an accommodation space, and components such as a main board and a speaker are disposed in the accommodation space. The shell 11 and the inner cover 12 may be connected by using a combination of a buckle and a sealing strip, or may implement sealed connection by using adhesive, so as to improve overall waterproof performance of the temple 100. A manner in which the shell 11 and the inner cover 12 are connected to form the temple 100 facilitates assembly of the components in the temple 100. In addition, a joint gap between the inner cover 12 and the shell 11 is disposed toward the head of the user, and is not exposed to the outside, thereby improving aesthetics of the temple 100.

A detection electrode 121 (a gray filled area in the figure) is disposed on the inner cover 12 in the are area 102, and the detection electrode 121 is configured to generate capacitive sensing between the detection electrode 121 and the human body. After the user wears the glasses, the inner cover 12 in the are area 102 fits the head of the user. Therefore, a distance between the detection electrode 121 in this area and the human body is very close, and the detection electrode 121 may even be disposed close to the human body, thereby improving capacitive sensing effect of the detection electrode 121.

Figure 5:
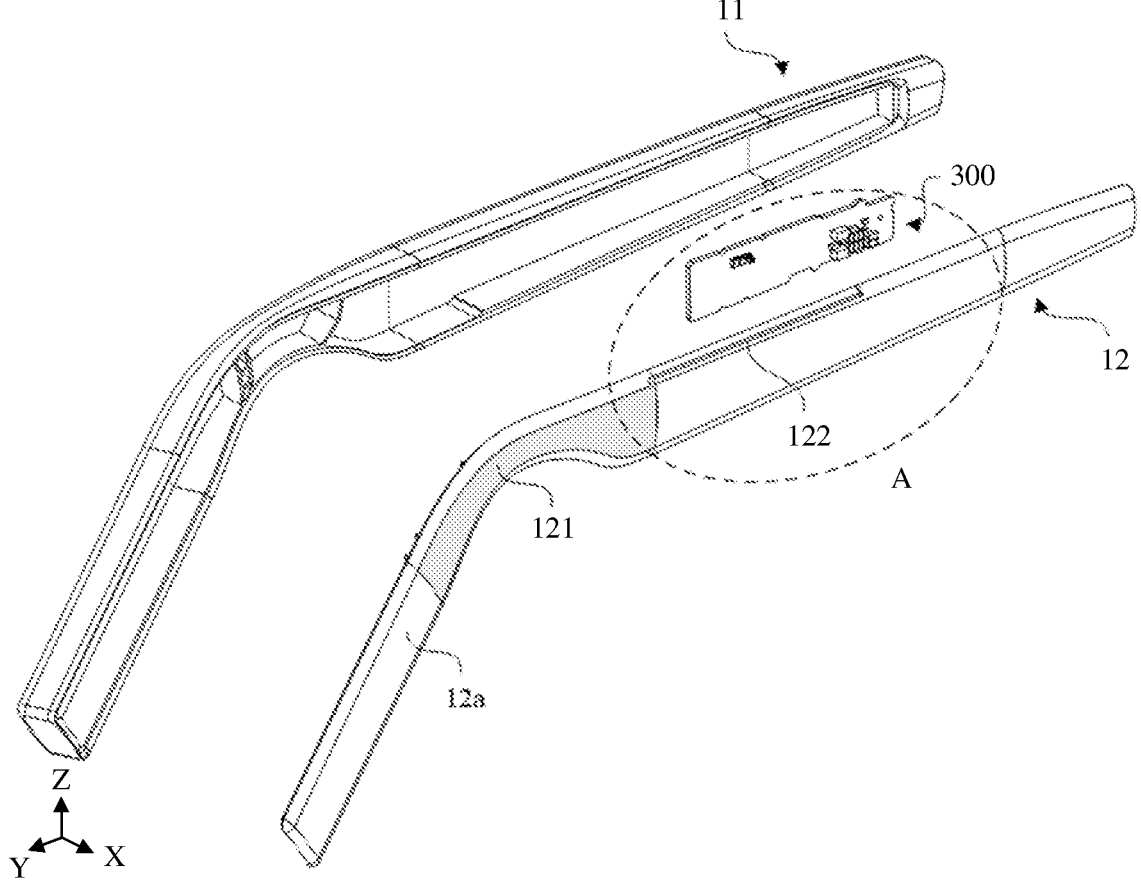
FIG. 5 is a schematic exploded diagram of a temple according to an embodiment of this application.
Figures 6, 7:
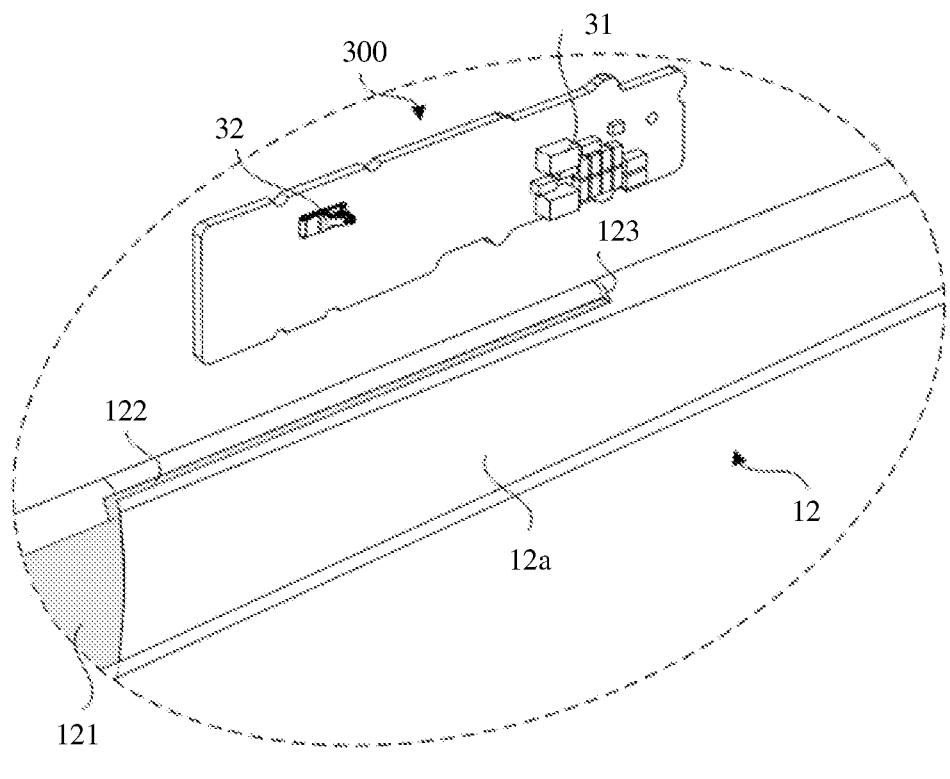
FIG. 6 is an enlarged view of a position A in FIG. 5.
FIG. 7 is a schematic exploded diagram of another angle of a temple according to an embodiment of this application.

FIG. 5 is a schematic exploded diagram of the temple according to an embodiment of this application. FIG. 6 is an enlarged view of a position A in FIG. 5. Refer to FIG. 5 and FIG. 6. A main board 300 is disposed in the accommodation space formed by enclosing the shell 11 and the inner cover 12, and the main board 300 may be disposed in the main body area 101. A wearing detection device 31 is disposed on the main board 300. For example, the wearing detection device 31 may include a capacitive proximity sensor (Capacitive Proximity Sensor, Cap Sensor). The detection electrode 121 is electrically connected to the main board 300, and the wearing detection device 31 is configured to determine, based on a capacitance change of the detection electrode 121, whether the user wears the glasses. After determining that the user wears the glasses, the main board 300 may control functions such as power-on, continuing to play music, and connecting a call, so as to reduce power-on time or reduce a user operation, to improve user experience. After determining that the user removes the glasses, the main board 300 may further control functions such as power-off, music pause, and phone hanging up, so that the glasses enter a low-power mode, so as to reduce power consumption, maximize device use time, and improve user experience.

When the detection electrode 121 is disposed on an outer wall surface 12*a* of the inner cover 12, on the one hand, the detection electrode 121 is very close to the human body, so that detection effect can be improved; and on the other hand, an area of the detection electrode 121 is not limited by an area of the accommodation space in the temple 100, and the detection electrode 121 may cover a partial or even an entire area of the outer wall surface 12*a* of the inner cover 12 in the are area 102. The area of the detection electrode 121 is greatly increased, and the detection effect can be improved.

In some embodiments of this application, the inner cover 12 is formed through laser direct structuring (Laser Direct Structuring, LDS), and laser activation is performed on a partial area on the outer wall surface 12*a* in the inner cover 12 to form the detection electrode 121.

The laser direct structuring technology can endow a plastic material with an electrical interconnection function, and a process may include: performing injection molding on a thermoplastic; then adding a special chemical agent for laser activation; and enabling a predetermined area on the plastic to produce physical and chemical reactions to implement metallizing. Injection molding is performed on an LDS plastic material, laser activation may be performed on a partial area obtained through molding to form a metal area, and the metal area can be used as the detection electrode 121. The detection electrode 121 prepared by using the LDS process directly uses the partial area on the outer wall surface 12a of the inner cover 12 as a metal electrode, and has a stable structure. In addition, a problem of fastening reliability does not need to be considered. Therefore, stability of a wearing detection function of the glasses is improved.

The detection electrode 121 disposed on the outer wall surface 12a of the inner cover 12 may be connected to the main board 300 in the temple 100 in a plurality of implementations. For example, the connection between the detection electrode 121 and the main board 300 may be implemented by using a structure such as a flexible circuit board, a metal cable, a metal spring plate, or a spring.

Still refer to FIG. 5 and FIG. 6. In a possible implementation, a conductive via 123 is disposed on the inner cover 12, and the detection electrode 121 is connected to the main board 300 through the conductive via 123.

The conductive via 123 is a via that is disposed on the inner cover 12 and penetrates inner and outer wall surfaces of the inner cover 12. The conductive via 123 has electrical connection performance, so as to connect to the main board 300 and the detection electrode 121 that are respectively located on inner and outer sides of the inner cover 12. The electrical connection performance of the conductive via 123 may be implemented through laser activation in the LDS process, or by covering the inside of the via with a metal material, or the like.

In a possible implementation, the conductive via 123 may be disposed on the inner cover 12 in the main body area 101, and may be disposed facing the main board 300, so as to facilitate the connection between the conductive via 123 and the main board 300. The conductive via 123 may be disposed at an edge of the inner cover 12, so as to facilitate processing and to greatly avoid impact on an appearance of the temple 100.

There is a distance between the detection electrode 121 disposed in the are area 102 and the conductive via 123 disposed in the main body area 101. In embodiments of this application, a connection electrode 122 is further disposed on the outer wall surface 12a of the inner cover 12, so as to be connected between the detection electrode 121 and the conductive via 123. The connection electrode 122 may be formed through laser activation like the detection electrode 121. A width of the connection electrode 122 is not specifically limited in embodiments of this application, for example, may be less than 1 mm.

In another possible implementation, the conductive via 123 may alternatively be disposed on the inner cover 12 in the are area 102, and the detection electrode 121 is directly connected to the conductive via 123. In this case, inside the inner cover 12, the conductive via 123 may be connected to the main board 300 by using a structure such as the connection electrode, a conductive cable, or the flexible circuit board disposed on an inner wall surface 12b of the inner cover 12.

Figure 8:
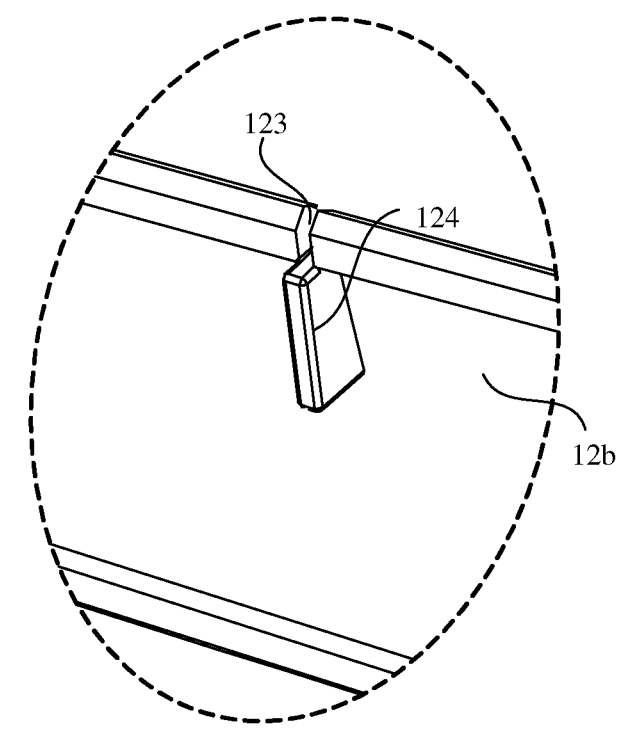
FIG. 8 is an enlarged schematic diagram of a position B in FIG. 7.

FIG. 7 is a schematic exploded diagram of another angle of the temple according to an embodiment of this application. FIG. 8 is an enlarged schematic diagram of a position B in FIG. 7. Refer to FIG. 7 and FIG. 8. A conductive rib 124 protrudes on the inner wall surface 12b of the inner cover 12, the conductive rib 124 is connected to the conductive via 123, and the main board 300 abuts against and is connected to the conductive rib 124 by using a spring plate 32.

A plurality of electronic components are disposed on a surface that is of the main board 300 and that faces the inner cover 12. There is a distance between the surface that is of the main board 300 and that faces the inner cover 12 and the inner wall surface 12b of the inner cover 12, and the conductive rib 124 protruding on the inner wall surface 12b of the inner cover 12 facilitates a connection between the main board 300 and the conductive via 123. In addition, the main board 300 is connected to an elastic component such as the spring plate 32 or a conductive spring, and the spring plate 32 contacts the conductive rib 124 to implement an electrical connection, so that reliability of the electrical connection can be ensured.

Electrical connection performance of the conductive rib 124 may be implemented through laser activation in the LDS process, or by covering the inside of the via with a metal material, or the like.

Figure 9:
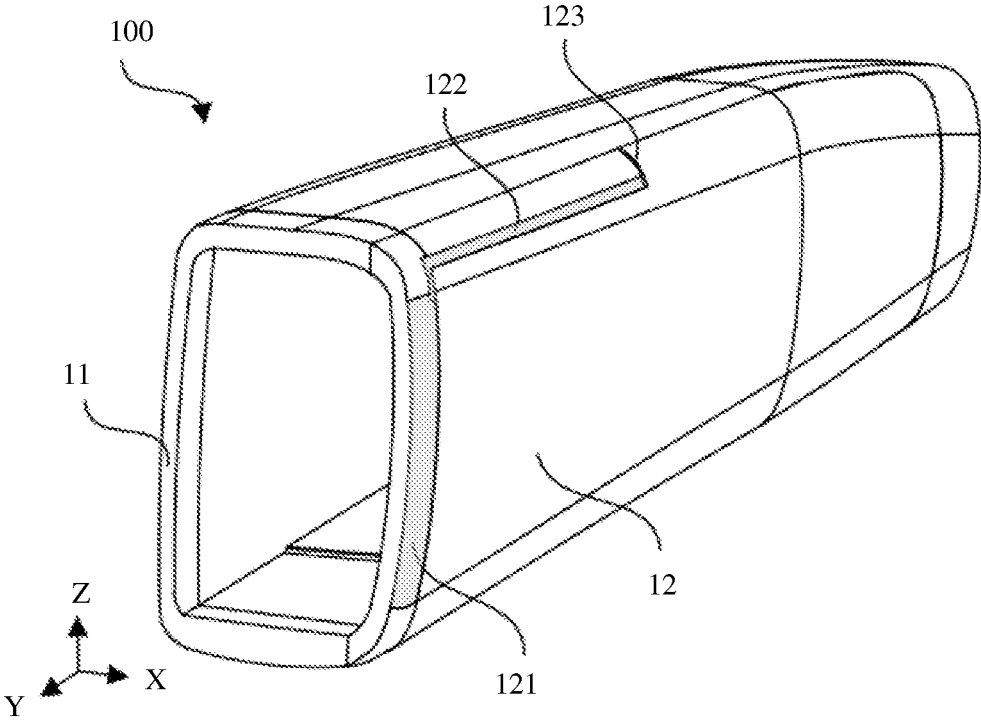
FIG. 9 is a schematic sectional diagram of a temple in an arc area according to an embodiment of this application.

FIG. 9 is a schematic sectional diagram of the temple in the are area according to an embodiment of this application. Refer to FIG. 9. A gray filled part in the figure represents a range covered by the detection electrode 121. Actually, it should be noted that a color of the detection electrode 121 obtained through laser activation is indeed different from a color of a surrounding plastic on which laser activation is not performed. In this embodiment of this application, an outer surface of the detection electrode 121 may be coated with an appearance paint layer, so that a color of the detection electrode 121 is consistent with a color of another position of the inner cover 12.

An actual process of coating the appearance paint layer may be a process of five painting, to be specific, painting and then drying for five times, to ensure exquisite effect of the appearance of the temple 100.

It can be learned from comparison between FIG. 9 and FIG. 2 that, the distance between the detection electrode 121 provided in embodiments of this application and the human body is a thickness of the appearance paint layer, and the thickness of the appearance paint layer is less than 0.1 mm, which is far less than a distance between a detection electrode and a human body in a related technology. Therefore, the detection effect of wearing detection can be greatly improved.

According to the glasses provided in this embodiment of this application, the laser direct structuring process is used to form the detection electrode by performing laser activation on the outer wall surface of the inner cover of the temple, so that a detection area can be increased, the distance between the detection electrode and the human body can be reduced, and a problem of unreliable fastening of the flexible circuit board can be avoided, thereby greatly optimizing the detection effect of the wearing detection function.

Figure 10:
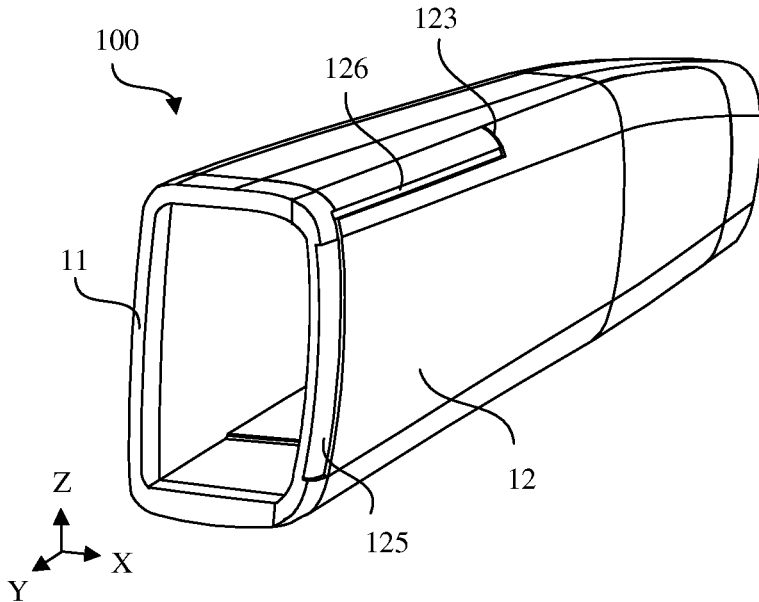
FIG. 10 is another schematic sectional diagram of a temple in an arc area according to an embodiment of this application.

FIG. 10 is another schematic sectional diagram of the temple in the are area according to an embodiment of this application. Refer to FIG. 10. In some other embodiments of this application, an accommodation groove 125 may be disposed on the outer wall surface 12a of the inner cover 12, and the accommodation groove 125 is filled with metal silver paste to form the detection electrode 121.

The inner cover 12 provided with the accommodation groove 125 may be formed through injection molding, and a material of the inner cover 12 is selected without considering whether the inner cover 12 meets performance required by the LDS process, and a material selection range of the inner cover 12 is wider. After the inner cover 12 is formed, the metal silver paste is brushed in the accommodation groove 125, and the metal silver paste is dried to form a thin metal silver layer. The thin metal silver layer has good conductive effect, and may be used as the detection electrode 121 to generate capacitive sensing between the detection electrode 121 and the human body.

The accommodation groove 125 is disposed on the outer wall surface 12a of the inner cover 12 in the are area 102, and a depth of the accommodation groove 125 is less than 0.1 mm, so as to prevent the accommodation groove 125 from affecting structural strength of the inner cover 12.

Correspondingly, the detection electrode 121 prepared by using the metal silver paste may also be connected to the main board 300 by using the connection electrode 122, the conductive via 123, the conductive rib 124, and the spring plate 32. For positions of the connection electrode 122, the conductive via 123, the conductive rib 124, and the spring plate 32, refer to the foregoing embodiments. Details are not described herein again.

The connection electrode 22 may be prepared by using metal silver paste like the detection electrode 121. A connection groove 126 is disposed on the outer wall surface 12a of the inner cover 12, and the connection groove 126 is connected between the accommodation groove 125 and the conductive via 123. Metal silver paste is covered in the connection groove 126 to form the connection electrode 122. The connection electrode 122 and the detection electrode 121 may be formed in a same process. In addition, electrical performance of the conductive via 123 and the conductive rib 124 may also be implemented by covering the metal silver paste. The detection electrode 121 and the connection electrode 122 may be formed in the same process, to improve production efficiency and reduce process costs.

It is not difficult to understand that, in this embodiment, the outer surface of the detection electrode 121 may also be coated with the appearance paint layer, so that the color of the detection electrode 121 is consistent with the color of the another position of the inner cover 12, so as to ensure the exquisite effect of the appearance of the temple 100.

According to the glasses provided in embodiments of this application, the groove is disposed on the outer wall surface of the inner cover of the temple, and the groove is coated with the metal silver paste to form the detection electrode, so that the detection area can be increased, the distance between the detection electrode and the human body can be reduced, and the problem of unreliable fastening of the flexible circuit board can be avoided, thereby greatly optimizing the detection effect of the wearing detection function.

In still some embodiments of this application, a metal insert part may be inserted into the inner cover 12 made of plastic, so that the metal insert part is used as the detection electrode.

In the foregoing embodiments of this application, there may be one or two detection electrodes 121. In a possible implementation, the detection electrode 121 is disposed on only the left temple or the right temple, and the wearing detection function of the glasses can be implemented. In another possible implementation, detection electrodes 121 are respectively disposed on inner covers 12 of the two temples 100, wearing detection devices 31 are respectively disposed inside the two temples 100, and the two wearing detection devices 31 are communicatively connected. When the two detection electrodes 121 are disposed, accuracy of wearing detection can be effectively improved. For example, wearing misjudgment caused by the user grasping the temple and touching the detection electrode 121 can be eliminated.

It should be noted that, in embodiments of this application, in addition to the main board 300, a speaker assembly, the battery, and another electronic component (not shown in the figure) may be further disposed inside the temple 100. The speaker assembly may be disposed in the main body area 101 of the temple 100, and disposed close to the are area 102. A sound opening connected to the speaker assembly is disposed on the are area 102, and is configured to guide sound to the ear of the user. The battery may be disposed in the temple tip 103. Electronic components such as the speaker assembly, the main board 300, and the battery may be connected by using the flexible circuit board to supply power. After the electronic components such as the speaker assembly, the main board 300, and the battery are assembled in the shell 11, the flexible circuit board may be connected, and then the inner cover 12 is assembled. After the inner cover 12 is assembled, the spring plate 32 contacts the conductive rib 124, so that the detection electrode 121 is connected to the main board 300, and implementation of the wearing detection function can be ensured.

According to the glasses provided in embodiments of this application, the detection electrode is disposed on the outer wall surface of the inner cover, so that the detection area can be increased, and the distance between the detection electrode and the human body can be reduced, thereby greatly optimizing the detection effect of the wearing detection function. In addition, compared with a solution in which a flexible circuit board inside the temple is used as the detection electrode in the related technology, the solution provided in embodiments of this application can completely avoid the problem of unreliable fastening of the flexible circuit board, and can improve space utilization inside the temple.

In another aspect, an embodiment of this application further provides a wearable system, including a terminal device and the glasses provided in the foregoing embodiments. The terminal device and the glasses are communicatively connected.

The terminal device may include a mobile phone, a tablet computer, a personal digital assistant (Personal Digital Assistant, PDA), a point of sale (Point of Sale, POS), a vehicle-mounted computer, and the like. A communication component is disposed in the glasses. The terminal device communicates with the glasses by using the communication component, and may send audio information, a control instruction, and the like to the glasses.

Improvement in detection effect of a wearing detection function of the glasses can improve overall intelligence and user experience of the wearable system. For example, after determining that a user wears the glasses, a main board in the glasses may control the glasses to enable Bluetooth to implement fast pairing and connection with the terminal device, so as to reduce operation complexity and improve user experience. Alternatively, after determining that the user removes the glasses, the main board in the glasses may further control the glasses to disconnect from the terminal device, and to disable Bluetooth, so as to reduce overall power consumption of the wearable system.

According to the wearable system provided in this embodiment of this application, the glasses having the wearing detection function is connected to the terminal device. For the glasses, a detection electrode is disposed on an outer wall surface of an inner cover, so that a detection area can be increased and a distance between the detection electrode and a human body can be reduced, thereby greatly optimizing the detection effect of the wearing detection function, and improving the overall user experience of the wearable system.

Finally, it should be noted that the foregoing embodiments are merely intended for describing technical solutions in embodiments of this application, instead of limiting the technical solutions. Although embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in embodiments of this application.

What is claimed is:

1. Glasses, comprising:
a glasses frame;
a first temple connected to a first side of the glasses frame; and
a second temple connected to a second side of the glasses frame,
wherein:
    the first temple comprises a shell and an inner cover,
    the inner cover covers the shell to form an accommodation space,
    a main board is disposed in the accommodation space,
    a wearing detection device is disposed on the main board,
    a detection electrode is disposed on an outer wall surface of the inner cover,
    the detection electrode is connected to the main board,
    the detection electrode is configured to generate capacitive sensing between the detection electrode and a human body,
    an accommodation groove is defined on the outer wall surface of the inner cover, and
    the accommodation groove is filled with metal silver paste to form the detection electrode.

2. The glasses according to claim 1, wherein:
a conductive via is disposed on the inner cover, and
the detection electrode is connected to the main board through the conductive via.

3. The glasses according to claim 2, wherein:
a conductive rib protrudes on an inner wall surface of the inner cover,
the conductive rib is connected to the conductive via, and
the main board abuts against and is connected to the conductive rib by using a spring plate.

4. The glasses according to claim 2, wherein:
a connection electrode is further disposed on the outer wall surface of the inner cover, and
the connection electrode is connected between the detection electrode and the conductive via.

5. The glasses according to claim 1, wherein:
the first temple comprises a main body area, an arc area, and a temple tip that are sequentially connected,
the main body area is connected to the glasses frame,
the main board is disposed in the main body area,
a battery is disposed in the temple tip,
the arc area is configured to be hung on an ear of a user, and
the detection electrode is disposed on the outer wall surface of the inner cover in the arc area.

6. The glasses according to claim 1, wherein an outer surface of the detection electrode is coated with an appearance paint layer.

7. The glasses according to claim 6, wherein a thickness of the appearance paint layer is less than 0.1 mm.

8. The glasses according to claim 1, wherein:
a first detection electrode is disposed on the inner cover of the first temple,
a first wearing detection device is disposed inside the first temple,
a second detection electrode is disposed on a second inner cover of the second temple,
a second wearing detection device is disposed inside the second temple, and
the first wearing detection device and the second wearing detection device are communicatively connected.

9. A wearable system, comprising:
a terminal device; and
glasses communicatively connected to the terminal device and comprising:
    a glasses frame;
    a first temple connected to a side of the glasses frame; and
    a second temple connected to a second side of the glasses frame,
wherein:
    the first temple comprises a shell and an inner cover,
    the inner cover covers the shell to form an accommodation space,
    a main board is disposed in the accommodation space,
    a wearing detection device is disposed on the main board,
    a detection electrode is disposed on an outer wall surface of the inner cover,
    the detection electrode is connected to the main board,
    the detection electrode is configured to generate capacitive sensing between the detection electrode and a human body,
    an accommodation groove is defined on the outer wall surface of the inner cover, and
    the accommodation groove is filled with metal silver paste to form the detection electrode.

10. The wearable system according to claim 9, wherein:
a conductive via is disposed on the inner cover, and
the detection electrode is connected to the main board through the conductive via.

11. The wearable system according to claim 10, wherein:
a conductive rib protrudes on an inner wall surface of the inner cover,
the conductive rib is connected to the conductive via, and
the main board abuts against and is connected to the conductive rib by using a spring plate.

12. The wearable system according to claim 10, wherein:
a connection electrode is further disposed on the outer wall surface of the inner cover, and
the connection electrode is connected between the detection electrode and the conductive via.

13. The wearable system according to claim 9, wherein:
the first temple comprises a main body area, an arc area, and a temple tip that are sequentially connected,
the main body area is connected to the glasses frame,
the main board is disposed in the main body area,
a battery is disposed in the temple tip,
the arc area is configured to be hung on an ear of a user, and
the detection electrode is disposed on the outer wall surface of the inner cover in the arc area.

14. The wearable system according to claim 9, wherein an outer surface of the detection electrode is coated with an appearance paint layer.

15. The wearable system according to claim 14, wherein a thickness of the appearance paint layer is less than 0.1 mm.

16. The wearable system according to claim 9, wherein:

a first detection electrode is disposed on the inner cover of the first temple, a first wearing detection device is disposed inside the first temple, a second detection electrode is disposed on a second inner cover of the second temple, a second wearing detection device is disposed inside the second temple, and the first wearing detection device and the second wearing detection device are communicatively connected.

\* \* \* \* \*